(12) United States Patent
Whelan

(10) Patent No.: US 10,417,651 B2
(45) Date of Patent: *Sep. 17, 2019

(54) FUEL CONSUMPTION PREDICTIONS USING ASSOCIATIVE MEMORIES

(71) Applicant: THE BOEING COMPANY, Chicago, IL (US)

(72) Inventor: John D. Whelan, Burien, WA (US)

(73) Assignee: THE BOEING COMPANY, Chicago, IL (US)

(*) Notice: Subject to any disclaimer, the term of this patent is extended or adjusted under 35 U.S.C. 154(b) by 2 days.

This patent is subject to a terminal disclaimer.

(21) Appl. No.: 15/818,228

(22) Filed: Nov. 20, 2017

(65) Prior Publication Data

US 2018/0073884 A1 Mar. 15, 2018

Related U.S. Application Data

(63) Continuation of application No. 15/061,699, filed on Mar. 4, 2016, now Pat. No. 9,823,086.

(51) Int. Cl.
G06Q 30/02 (2012.01)
G07C 5/08 (2006.01)
G01C 21/20 (2006.01)

(52) U.S. Cl.
CPC ......... *G06Q 30/0202* (2013.01); *G01C 21/20* (2013.01); *G07C 5/085* (2013.01); *G07C 5/0808* (2013.01)

(58) Field of Classification Search
CPC ............ G01C 21/3469; G01C 21/3697; G06Q 30/0202; G07C 5/085; G07C 5/0808
See application file for complete search history.

(56) References Cited

U.S. PATENT DOCUMENTS

| 2011/0060495 A1 | 3/2011 | Kono et al. |
| 2013/0075532 A1 | 3/2013 | Fuscone et al. |
| 2016/0061616 A1 | 3/2016 | Meyer et al. |

FOREIGN PATENT DOCUMENTS

WO 2015/196259 A1 12/2015

OTHER PUBLICATIONS

Notice of Allowance for U.S. Appl. No. 15/061,699 dated Jul. 19, 2017.
Office Action for U.S. Appl. No. 15/061,699 dated Feb. 23, 2017.

*Primary Examiner* — Michael J Zanelli
(74) *Attorney, Agent, or Firm* — Patterson + Sheridan, LLP

(57) ABSTRACT

A method, system, and computer program product for predicting fuel consumption for a vehicle operation is provided. An associative memory device is accessed, using one or more attributes of an operation plan for the planned vehicle operation, to determine at least one historical vehicle operation from a plurality of historical vehicle operations that is similar to the planned vehicle operation. The associative memory device contains data for a plurality of attributes and collected from the plurality of historical vehicle operations. The at least one historical vehicle operation is determined by applying a respective weight defined within the associative memory device to data values for each of the plurality of attributes. Fuel consumption data for the planned vehicle operation is predicted, based on historical fuel consumption data corresponding to the at least one historical vehicle operation. The predicted fuel consumption data is output.

20 Claims, 7 Drawing Sheets

HISTORICAL VEHICLE OPERATION
FLIGHT NO.: 261
DATE: JANUARY 12, 2016

ATTRIBUTES

| CATEGORY | VALUE |
|---|---|
| AIRCRAFT TYPE: | 737-800 |
| AIRCRAFT SERIAL NO.: | 12345 |
| DEPARTURE AIRPORT: | SEA |
| ARRIVAL AIRPORT: | ORD |
| # PASSENGERS: | 122 |
| # CREW: | 5 |
| TAKEOFF WEIGHT: | 170,000 |
| PRECIPITATION: | HEAVY RAIN |
| CLOUDS: | SCATTERED |
| FOG: | NONE |
| CRUISING ALTITUDE: | 34,000 |
| CRUISING SPEED: | 0.81 |
| DISTANCE: | 1,721 |

WEIGHTINGS ~208

| CATEGORY | LOW | MED. | HIGH | ALLOWABLE RADIUS |
|---|---|---|---|---|
| AIRCRAFT TYPE: | X | | | |
| AIRCRAFT SERIAL NO.: | X | | | |
| DEPARTURE AIRPORT: | | X | | |
| ARRIVAL AIRPORT: | | X | | |
| # PASSENGERS: | | X | | 0.05 |
| # CREW: | X | | | 0.00 |
| TAKEOFF WEIGHT: | | | X | 0.10 |
| PRECIPITATION: | X | | | |
| CLOUDS: | X | | | |
| FOG: | X | | | |
| CRUISING ALTITUDE: | | X | | 0.10 |
| CRUISING SPEED: | | X | | 0.10 |
| DISTANCE: | | | X | 0.15 |

# FUEL CONSUMPTION PREDICTIONS USING ASSOCIATIVE MEMORIES

CROSS-REFERENCE TO RELATED APPLICATIONS

This application is a continuation of U.S. patent application Ser. No. 15/061,699 filed Mar. 4, 2016. The above-mentioned applications are hereby incorporated by reference.

BACKGROUND

Calculating a fuel load for a vehicle operation can be a challenging undertaking. Various methods and assumptions can be used to estimate an amount of fuel needed to complete a vehicle operation, such as a flight of a commercial aircraft from a departure airport to an arrival airport. Properly calculating the fuel load for a vehicle operation is important to ensure success of the operation. For example, if too little fuel is on board the vehicle, then the vehicle may have to stop prematurely to get more fuel. For example, a commercial aircraft may have to make an unscheduled stop for additional fuel if the calculated fuel load is insufficient. As another example, if too much fuel as a vehicle, then the vehicle needlessly carries extra weight, which reduces the efficiency and increases the cost of the vehicle operation.

SUMMARY

According to one aspect, a computer-implemented method for calculating a predicted fuel consumption for a planned vehicle operation is provided. The method includes accessing an associative memory device, using one or more attributes of an operation plan for the planned vehicle operation, to determine at least one historical vehicle operation from a plurality of historical vehicle operations that is similar to the planned vehicle operation, where the associative memory device contains data for a plurality of attributes and collected from the plurality of historical vehicle operations, and where the at least one historical vehicle operation is determined by applying a respective weight defined within the associative memory device to data values for each of the plurality of attributes. The method also includes predicting fuel consumption data for the planned vehicle operation, based on historical fuel consumption data corresponding to the at least one historical vehicle operation. Additionally, the method includes outputting the predicted fuel consumption data.

According to one aspect, a system includes one or more computer processors, an associative memory device and a computer memory. The computer contains computer program code that, when executed by operation of the one or more computer processors, performs an operation for calculating a predicted fuel consumption for a planned vehicle operation. The operation includes accessing the associative memory device, using one or more attributes of an operation plan for the planned vehicle operation, to determine at least one historical vehicle operation from a plurality of historical vehicle operations that is similar to the planned vehicle operation, where the associative memory device contains data for a plurality of attributes and collected from the plurality of historical vehicle operations, and where the at least one historical vehicle operation is determined by applying a respective weight defined within the associative memory device to data values for each of the plurality of attributes. Additionally, the operation includes predicting fuel consumption data for the planned vehicle operation, based on historical fuel consumption data corresponding to the at least one historical vehicle operation. The operation also includes outputting the predicted fuel consumption data.

According to one aspect, a computer-implemented method for determining a predicted fuel consumption for a planned vehicle operation is provided. The method includes generating a query configured to return predicted fuel consumption data for an operation plan for the planned vehicle operation. The method also includes transmitting the generated query to a remote system. The remote system is configured to access an associative memory device, using one or more attributes of the operation plan for the planned vehicle operation, to determine at least one historical vehicle operation from a plurality of historical vehicle operations that is similar to the planned vehicle operation, where the associative memory device contains data for a plurality of attributes and collected from the plurality of historical vehicle operations, and where the at least one historical vehicle operation is determined by applying a respective weight defined within the associative memory device to data values for each of the plurality of attributes. The remote system is further configured to predict fuel consumption data for the planned vehicle operation, based on historical fuel consumption data corresponding to the at least one historical vehicle operation. The method includes receiving, from the remote system, the predicted fuel consumption data.

BRIEF DESCRIPTION OF THE DRAWINGS

FIG. 2 is a block diagram illustrating an exemplary instantiation of a historical vehicle operation stored in an associative memory;

FIG. 3 is an illustration of a graphical user interface according to one aspect for entering weightings for attributes of historical vehicle operations and allowable radii for values of certain attributes;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In various aspects described herein, fuel consumption data from one or more historical vehicle operations is used to predict fuel consumption for a planned vehicle operation. Instantiations of historical vehicle operations are stored in an associative memory, and attributes of the historical vehicle operations are weighted based on their significance with respect to fuel consumption. Values of attributes for the planned vehicle operation are used to search the associative memory and the associative memory returns historical vehicle operations that are most similar to the planned vehicle operation based on the values of the attributes. Fuel consumption data for the returned historical vehicle operations is extracted and a predicted fuel consumption for the planned vehicle operation is calculated based on the returned fuel consumption data. The predicted fuel consumption can be incorporated into a vehicle operation plan (e.g., a load sheet for a commercial flight operation) that indicates a fuel load for the planned vehicle operation.

Figure 1:
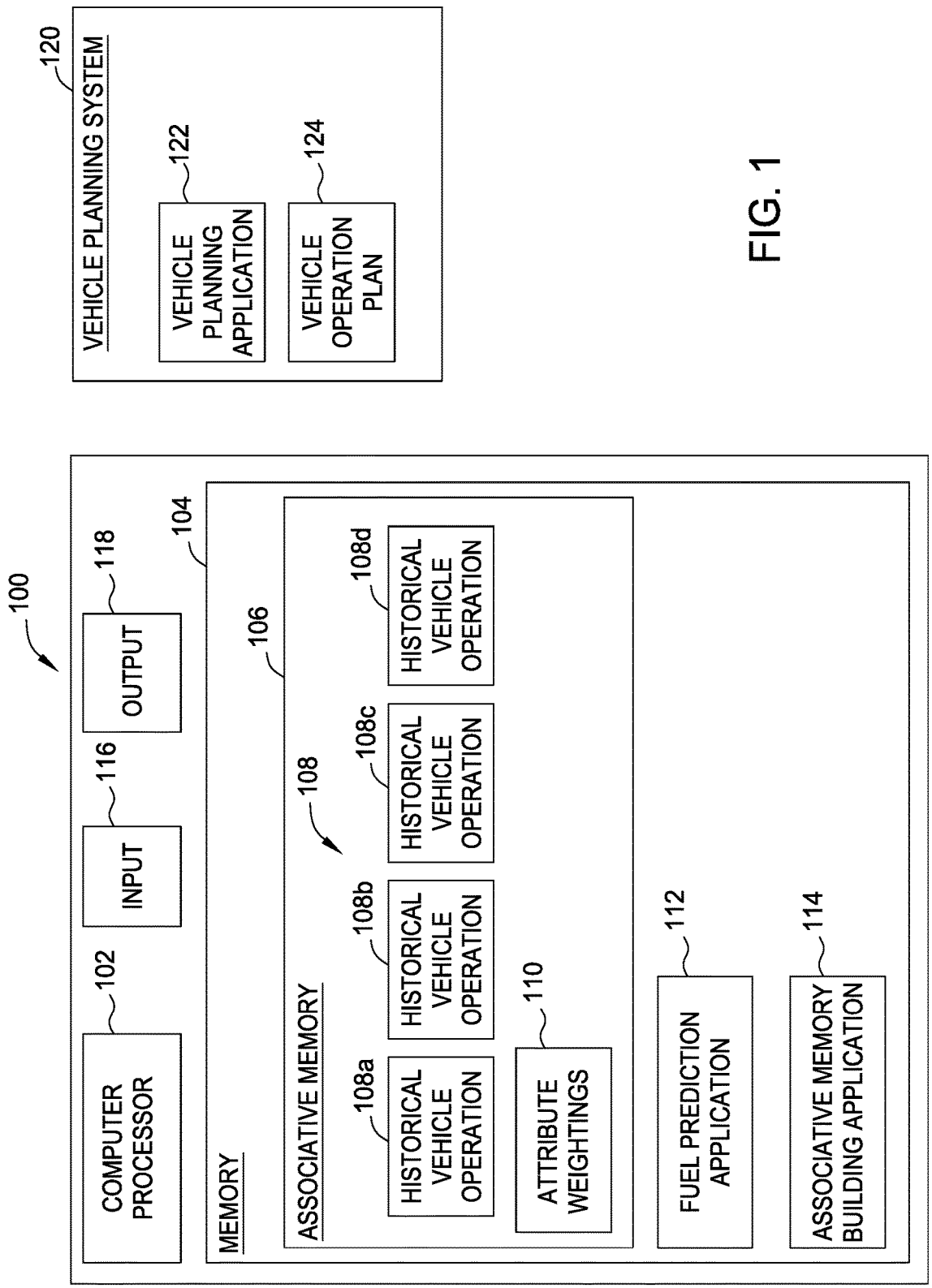
FIG. 1 is a block diagram of a system according to one aspect for implementing an associative memory to predict fuel consumption.

FIG. 1 illustrates a system 100 according to one aspect for predicting fuel consumption for a planned vehicle operation. The system 100 includes a computer processor 102 and a memory 104. The memory 104 includes an associative memory data structure 106, the fuel prediction application 112, and an associative memory building application 114. The associative memory 106 includes instantiations of historical vehicle operations 108, collectively. FIG. 1 illustrates four historical vehicle operations 108: a first historical vehicle operation 108a, a second historical vehicle operation 108b, a third historical vehicle operation 108c, and a fourth historical vehicle operation 108d. In use, the associative memory 106 would likely include hundreds, thousands, or millions of historical vehicle operations 108. As we discussed in greater detail with respect to FIG. 2, below, the historical vehicle operations 108 include different attribute categories, and the values of the attribute categories define parameters of the historical vehicle operations 108. For example, referring to commercial aircraft operations, a historical vehicle operation may include attribute categories that identify the aircraft type, the departure airport, the arrival airport, the cruise altitude, the cruise speed, and the distance traveled. The associative memory 106 can include attribute weightings 110 that indicate relative importance of certain attributes relative to other attributes. For example, continuing the example of the commercial aircraft operation, the departure airport and arrival airport may be less important than the distance traveled. As a result, the weightings for the departure airport attribute and the arrival airport attribute would be lower than a weighting for the distance traveled attribute.

The system 100 can also include an input 116 and an output 118. The input 116 and the output 118 can communicate with a vehicle planning system 120. The vehicle planning system 120 can include a vehicle planning application 122 and a vehicle operation plan 124. The vehicle planning application 122 is executable by the vehicle planning system 120 to prepare the vehicle operation plan 124 for a planned vehicle operation. The vehicle operation plan 124 for the planned vehicle operation includes planned values for the various attribute categories. The planned values for the attribute categories in the vehicle operation plan 124 can be transmitted to the system 100 via the input 116. Similarly, after the system 100 predicts fuel consumption for the planned vehicle operation, as discussed in greater detail below, the system 100 can output the predicted fuel consumption to the vehicle planning system 120 via the output 118. The vehicle planning application 122 can then incorporate the predicted fuel consumption for the planned vehicle operation into the vehicle operation plan 124.

FIG. 2 is a block diagram of an exemplary historical vehicle operation 108n stored in the associative memory 106. The exemplary historical vehicle operation 108n includes identifying information such as a flight number 202 and a date 204 of the flight for a commercial aircraft. The exemplary historical vehicle operation 108n also includes attribute data 206. The attribute data 206 is arranged as attribute categories, indicated in column 208, and values for the different categories, indicated in column 210. The exemplary attribute data 206 includes an aircraft type attribute category 212, and a value 214 of 737-800 (i.e., a Boeing 737-800). The exemplary attribute data 206 includes an aircraft serial number attribute category 216, and a value 218 of 12345. The exemplary attribute data 206 includes a departure airport attribute category 220, and a value 222 of SEA, which is the airport code for Seattle-Tacoma International Airport. The exemplary attribute data 206 includes an arrival airport attribute category 224, and a value 226 of "ORD", which is the airport code for O'Hare International Airport in Chicago, Ill. The exemplary attribute data 206 includes a number of passengers attribute category 228, and a value 230 of 122 (i.e., 122 passengers). The exemplary attribute data 206 also includes a number of crew attribute category 232, and a value 234 of 5 (i.e., five passengers). The exemplary attribute data 206 also includes a takeoff weight attribute category 236 and a value 238 of 170,000 (i.e., 170,000 pounds). The exemplary attribute data 206 also includes a precipitation attribute category 240, and a value 242 of "heavy rain." The attribute data 206 also includes a clouds attribute category 244, and a value 246 of "scattered." The attribute data 206 also includes a fog attribute category 248, and a value 250 of "none." The attribute data 206 also includes a cruising altitude attribute category 252 and a value 254 of 34,000 (i.e., 34,000 feet above sea level). The attribute data 206 also includes a cruising speed attribute category 256 and a value 258 of 0.81 (i.e., Mach 0.81). The attribute data 206 also includes a distance attribute category 260 and a value 262 of 1,721 (i.e., 1,721 nautical miles). The attribute categories and values of the attribute data 206 shown in FIG. 2 are exemplary. In various aspects, the attribute data 206 could include many additional attribute categories and/or values.

The attribute data 206 includes attribute categories that have numeric or quantifiable values as well as attribute categories that have non-numeric or non-quantifiable values.

For example, the cruising altitude attribute category 252, the cruising speed attribute category 256 and the distance attribute category 260 all have numeric or quantifiable values. By contrast, the precipitation attribute category 240, the clouds attribute category 244, and the fog attribute category 248 have non-numeric or non-quantifiable values.

As discussed above, the associative memory 106 can also include attribute weightings 110 that indicate relative importance of an attribute category relative to other attribute categories. In various aspects, the attribute weightings 110 could be determined by a user, such as a subject matter expert. For example, an airline dispatcher may set weightings for attribute categories in the associative memory building application 114. In various other aspects, the attribute weightings 110 could be determined by the associative memory building application 114 executing on the computer processor 102.

FIG. 3 illustrates an exemplary graphical user interface 300 that a subject matter expert could use to set the attribute weightings 110 for the attribute categories 208 discussed above with reference to FIG. 2. In the exemplary graphical user interface 300, the attribute categories can be set to one of five different weightings 302: a low weighting 304, a medium-low-weighting 306, a medium weighting 308, a medium-high weighting 310, and a high weighting 312. Continuing the example above, the aircraft type attribute category 212 is assigned a high weighting 312. The aircraft serial number attribute category 216 is assigned a low weighting 304. The departure airport attribute category 220 is assigned a medium weighting 308. The arrival airport attribute category 224 is assigned medium weighting 308. The number of passengers attribute category 228 is assigned a medium weighting 308. The number of crew attribute category 232 is assigned a medium-low weighting 306. The takeoff weight attribute category 236 is assigned a medium-high weighting 310. The precipitation attribute category 240 is assigned a medium-low weighting 306. The clouds attribute category 244 is assigned a medium-low weighting 306. The fog attribute category 248 is assigned medium-low weighting 306. The cruise altitude attribute category 252 is assigned a medium-high weighting 310. The cruising speed attribute category 256 is assigned medium-high weighting 310. The distance attribute category 260 is assigned a high weighting 312. In use, a user (e.g., a subject matter expert) could interact with the graphical user interface 300 to select weightings for the various categories using a computer mouse, touch screen, keyboard, or other input device. The weightings influence the results returned from the associative memory (e.g., the associative memory 106 in FIG. 1).

In various aspects, a user could also use the graphical user interface 300 to select allowable ranges or radii for values of categories that are acceptable for returned historical vehicle operations. The graphical user interface 300 illustrated in FIG. 3 includes an allowable radius field 330, which a subject matter expert or other user could enter such radii for at least certain categories of attributes. For example, the allowable radius field 330 includes a first radius 332 with a value of 0.05 or 5%. Using the first radius 332, a value for the number of passengers attribute category 228 for a historical vehicle operation will only be considered similar to a predicted value for a future vehicle operation if the value is within the percentage indicated by the radius. For example, suppose that a future vehicle operation is predicted to have 100 passengers (i.e., a value for the number of passengers attribute category 228 of 100). In such instances, historical vehicle operations that have a value for the number of passengers attribute category 228 of between 95 and 105 would be considered similar.

The allowable radius field 330 includes additional radii for other attribute categories. For example, the allowable radius field 330 includes a second radius 334 for the number of crew attribute category 232, which is set to a value of 0.00, meaning the value for the number of crew attribute category 232 of historical vehicle operations must exactly match the value of the number of crew attribute category 232 for a planned vehicle operation to be considered similar. As another example, the allowable radius field 330 includes a third radius 336 for the takeoff weight attribute category 236, which is set to a value of 0.10 or 10%, meaning the value for the takeoff weight attribute category 236 of historical vehicle operations must be within 10% of the value of the takeoff weight attribute category 236 for a planned vehicle operation to be considered similar. As another example, the allowable radius field 330 includes a fourth radius 338 for the cruising altitude attribute category 252, which is set to a value of 0.10 or 10%, meaning the value for the cruising altitude attribute category 252 of historical vehicle operations must be within 10% of the value of the cruising altitude attribute category 252 for a planned vehicle operation to be considered similar. As another example, the allowable radius field 330 includes a fifth radius 340 for the cruising speed attribute category 256, which is set to a value of 0.10 or 10%, meaning the value for the cruising speed attribute category 256 of historical vehicle operations must be within 10% of the value of the cruising speed attribute category 256 for a planned vehicle operation to be considered similar. As another example, the allowable radius field 330 includes a sixth radius 342 for the distance attribute category 260, which is set to a value of 0.15 or 15%, meaning the value for the distance attribute category 260 of historical vehicle operations must be within 15% of the value of the distance attribute category 260 for a planned vehicle operation to be considered similar.

The user provided weightings and/or allowable radii can be used by the fuel prediction application 112 executing on the computer processor 102 to influence which historical vehicle operations 108 in the associative memory 106 are identified as being similar to a planned vehicle operation (e.g., the vehicle operation plan 124 stored in the vehicle planning system 120).

Figure 4A:
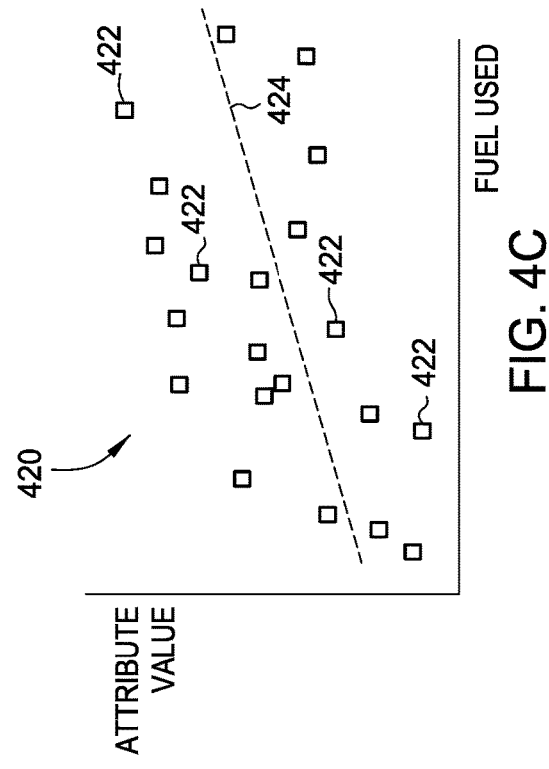
FIG. 4A is a graphical representation of exemplary values of an attribute that are highly correlated with fuel consumption.

In various aspects, the associative memory building application 114 can automatically determining weightings for various attribute categories. For example, in one aspect, the associative memory building application 114 can assign high weightings to attribute categories having values that are strongly correlated to fuel consumption across historical vehicle operations and can assign low weightings to attribute categories having values that are weakly correlated or not correlated to fuel consumption across historical vehicle operations. For example, FIG. 4A illustrates a chart 400 of values for a particular attribute category against fuel consumption for the various historical vehicle operations. Each instance of a value for the attribute category and an associated fuel consumption is represented as an open square 402. As depicted in FIG. 4A, a line 404 is fit through the instances 402, and the instances 402 are relatively compact with respect to the line 404. Additionally, fuel consumption increases as the value of the attribute increases. Thus, the values for the particular attribute category are highly, positively correlated with fuel consumption. For example, in the context of commercial aviation, fuel consumption could be highly, positively correlated with values of an attribute category such as takeoff weight and/or number of passengers.

Figure 4C:
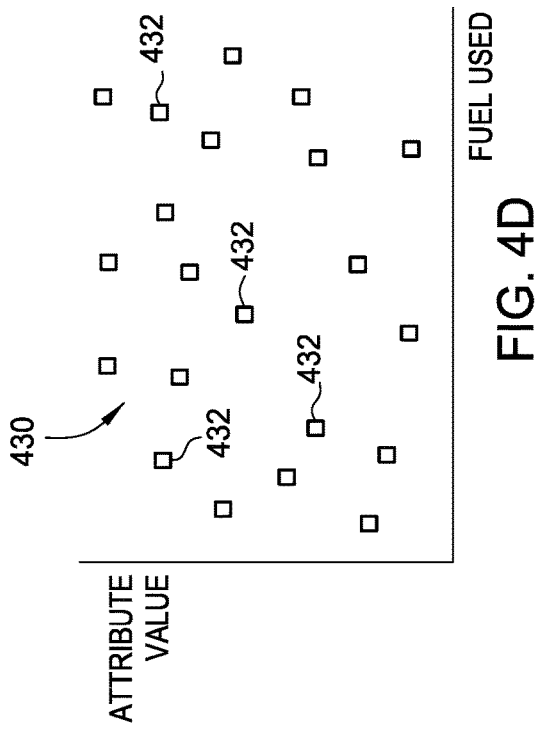
FIG. 4C is a graphical representation of exemplary values of another attribute that are weakly correlated with fuel consumption.
Figure 4B:
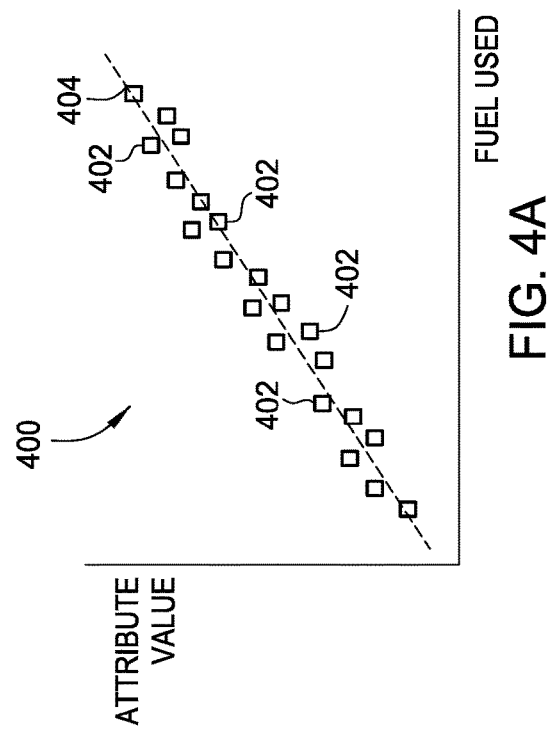
FIG. 4B is a graphical representation of exemplary values of another attribute that are highly correlated with fuel consumption.

FIG. 4B illustrates a chart 410 of values for a particular attribute category against fuel consumption for the various historical vehicle operations in which the values are negatively correlated with fuel consumption. Each instance of a value for the attribute category and an associated fuel consumption is represented as an open square 412. As depicted in FIG. 4B, a line 414 fits through the instances 412, and the instances 412 are relatively compact with respect to the line 414. Additionally, fuel consumption increases as the value of the attribute decreases. Thus, the values for the particular attribute category are highly, negatively correlated with fuel consumption. For example, in the context of commercial aviation, fuel consumption could be highly, negatively correlated with values of an attribute category such as aircraft serial number. In many instances, aircraft serial numbers increase in a sequential manner, meaning that older airframes have lower serial numbers the newer airframes. Over time, an airframe generally gets heavier as equipment is added and/or as insulation absorbs water, for example. Thus, older aircraft with lower serial numbers may weigh more and use more fuel on a given flight than a newer aircraft. As a result, values for aircraft serial number attribute category could be negatively correlated with fuel consumption.

FIG. 4C illustrates a chart 420 of values for a particular attribute category against fuel consumption for the various historical vehicle operations in which the values are weakly correlated with fuel consumption. Each instance of a value for an attribute category and an associated fuel consumption is represented as the square 422. As depicted in FIG. 4C, a line 424 fits through the instances 422, but the instances 422 are relatively spread out with respect to the line 424.

Figure 4D:
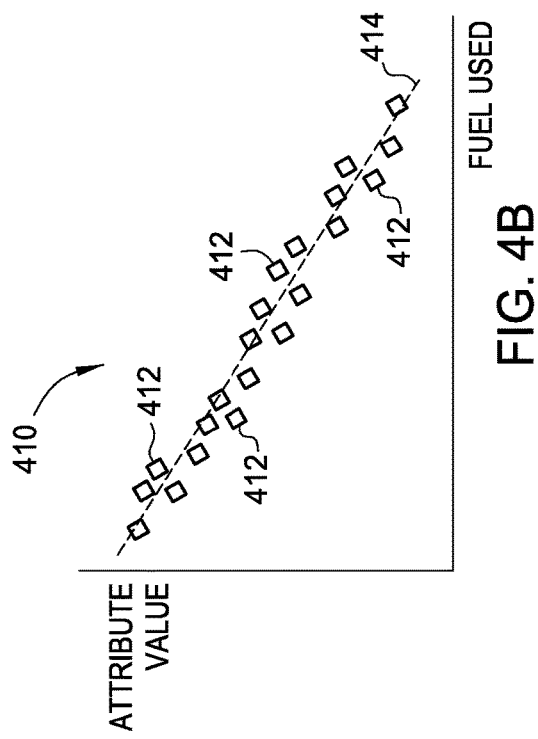
FIG. 4D is a graphical representation of exemplary values of another attribute that are not correlated with fuel consumption.

FIG. 4D illustrates a chart 430 in which values for a particular attribute category for the various historical vehicle operations are not correlated with fuel consumption. Each instance of a value for an attribute category and an associated fuel consumption is represented as a square 432, and there is no line that adequately fits to the data.

Figure 4E:
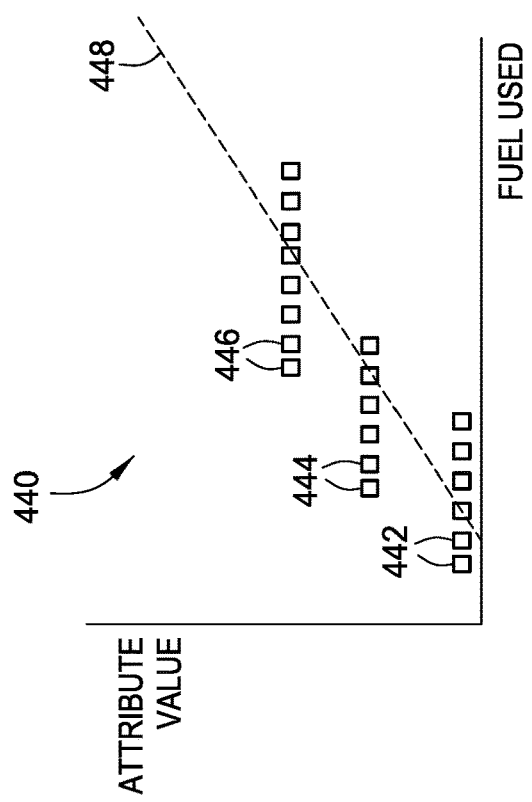
FIG. 4E is a graphical representation of exemplary values of another attribute that are correlated by certain groupings with fuel consumption.

FIG. 4E illustrates a chart 440 of values for a particular attribute category against fuel consumption for the various historical vehicle operations in which the values are correlated with fuel consumption in a structured manner. For example, the exemplary data illustrated in the chart 440 includes a first set of data 442 (i.e., instances of historical vehicle operations) having a first value for the attribute category, a second set of data 444 (i.e., instances of historical vehicle operations) having a second value for the attribute category, and a third set of data 446 (i.e., instances of historical vehicle operations) having a third value for the attribute category. Each of the sets of data 442, 444, and 446 covers a range of fuel consumption values, and a line 448 can fit through the data such that there is at least a weak correlation. Such sets of data could occur with an attribute category such as a model designation for aircraft. For example, the Boeing 737 includes several sub models such as the 737-700, the 737-800, and the 737-900, wherein the -800 model is larger than the -700 model and the -900 model is larger than the -800 model. Referring again to the chart 440 in FIG. 4E, the first data set 442 could be instances of historical vehicle operations on 737-700 models, the second data set 444 could be instances of historical vehicle operations on 737-800 models, and the third data set 446 could be instances of historical vehicle operations on 737-900 models.

As discussed above, aspects of the associative memory building application 114 executing on the computer processor 102 analyze the values of the attribute categories across the historical vehicle operations 108 stored in the associative memory 106 to identify any correlations between a particular value and fuel consumption. Attribute categories that are highly correlated with fuel consumption could be given a high weighting, attribute categories that are weakly correlated with fuel consumption could be given a medium weighting, and attribute categories that are not correlated with fuel consumption could be given a low weighting, for example. The resulting attribute weightings 110 can be stored in the associative memory 106. Referring again to FIG. 3, the associative memory building application 114 could output the determined weightings to a graphical user interface, such as the graphical user interface 300, to illustrate the weightings that have been assigned to the different attribute categories. In at least one aspect, a subject matter expert or other user could use the graphical user interface override or change the weightings determined by the associative memory building application 114.

After the weightings and/or any allowable radii have been determined for the various attribute categories, the associative memory 106 of historical vehicle operations 108 can be searched for operations that are similar to a vehicle operation plan 124 for a future vehicle operation. In at least one aspect, a similarity score for a particular historical vehicle operation can be determined mathematically based on the weightings for the different attribute categories and differences of the values for the attribute categories between the particular historical vehicle operation and the planned vehicle operation. For example, the similarity score could be calculated according to Equation (1):

$$\text{SIMILARITY SCORE} = \frac{1}{W_a \Delta V_a + W_b \Delta V_b + \ldots + W_n \Delta V_n}; \quad (1)$$

where $W_a$ is a weighting for a first attribute category, $W_b$ is a weighting for a second attribute category, $W_n$ is a weighting for an nth attribute category, $\Delta V_a$ is a difference in the value for the first attribute category between the particular historical vehicle operation and the planned vehicle operation, $\Delta V_b$ is a difference in the value for the second attribute category between the particular historical vehicle operation and the planned vehicle operation, and $\Delta V_n$ is a difference in the value for the nth attribute category between the particular historical vehicle operation and the planned vehicle operation. In various aspects, the values could be normalized such that the units or scale of values for one attribute category have approximately equal significance to the units or scale of values for other attribute categories. For example, the values could be normalized such that a takeoff weight difference between a historical vehicle operation and the planned vehicle operation of 10,000 pounds does not completely outweigh a cruise speed difference of 10 knots. In various aspects, such normalization could be provided by the weightings. In various aspects, the difference between values can be provided as an absolute value. The resulting similarity score from Equation (1) will be larger for historical vehicle operations that are very similar to the planned vehicle operation and smaller for historical vehicle operations that are less similar or very different from to the planned vehicle operation.

In various aspects, different equations could be used to calculate a similarity score. Depending on the equation, the relationship between the similarity of a particular historical vehicle operation in the planned vehicle operation and the score could be different. For example, a similarity score could be calculated based on equation that is the inverse of Equation (1). In such a case, the resulting similarity score will be larger for historical vehicle operations that are very different from the planned vehicle operation and smaller for historical vehicle operations that are most similar to the planned vehicle operation.

Figure 5:
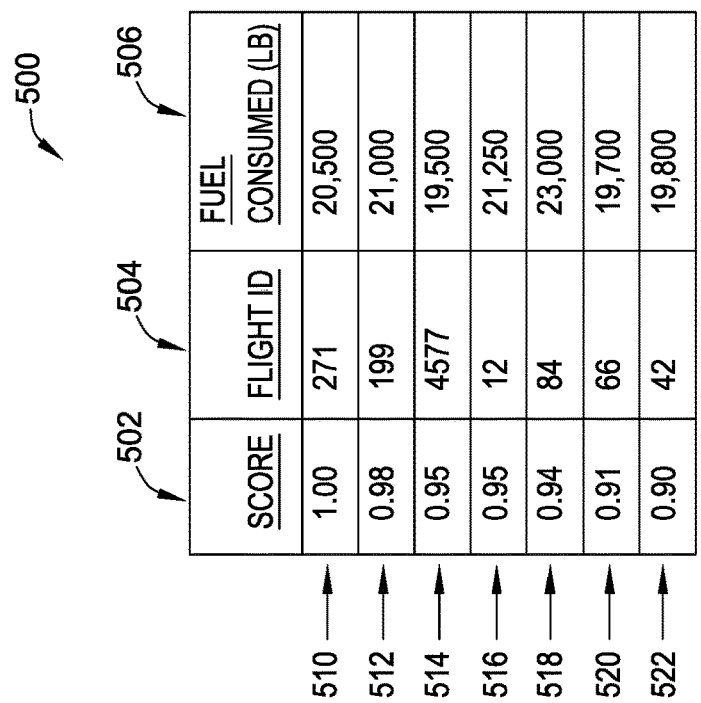
FIG. 5 is a block diagram of illustrating exemplary returned vehicle operations from an associative memory and extracted fuel consumption data from the returned operations.

FIG. 5 illustrates a table 500 of exemplary historical vehicle operations that have been returned after the fuel prediction application 112 mathematically determined which historical vehicle operations 108 are most similar to a planned vehicle operation. The table 500 includes a first column 502 to indicate scores (i.e., similarity scores computed according to Equation (1) or another equation). The table 500 optionally includes a second column 504 that includes identification information for the different historical vehicle operations, such as a flight number of commercial flight and/or a date of the flight. The table 500 also includes a fuel consumption column 506 that identifies the amount of fuel consumed by the determined historical vehicle operations.

The first returned historical vehicle operation 510 has a score of 1.00 and a fuel consumption of 20,500 pounds. The second returned historical vehicle operation 512 has a score of 0.98 and a fuel consumption of 21,000 pounds. The third returned historical vehicle operation 514 has a score of 0.95 and a fuel consumption of 19,500 pounds. The fourth returned historical vehicle operation 516 has a score of 0.95 and a fuel consumption of 21,250 pounds. The fifth historical vehicle operation 518 has a score of 0.94 and a fuel consumption of 23,000 pounds. The sixth historical vehicle operation 520 has a score of 0.91 and a fuel consumption of 19,700 pounds. The seventh historical vehicle operation 522 has a score of 0.90 and a fuel consumption of 19,800 pounds.

The scores can be normalized with respect to each other. For example, with reference to Equation (1) discussed above, the resulting similarity scores may have a wide range of values. In at least one aspect, the scores for returned historical vehicle operations could be normalized by dividing each of the scores by the highest score such that the highest score is equal to 1.00 and the other scores will have values equal to or less than 1.00, for example. In other aspects, the scores could be normalized in other manners.

The number of historical vehicle operations returned by the fuel prediction application 112 can be determined in several different ways. For example, the fuel prediction application 112 could return all historical vehicle operations with a score above or below a threshold value. As another example, the fuel prediction application 112 could return the ten historical vehicle operations (or another number of historical vehicle operations) with the highest or lowest scores.

The fuel prediction application 112 can predict fuel consumption for the planned vehicle operation based on the returned historical vehicle operations in table 500. In at least one aspect, the fuel prediction application 112 could select the highest fuel consumption from the table 500 and use the selected highest fuel consumption as the predicted fuel consumption for the planned vehicle operation. For example, the fuel prediction application 112 could select the 23,000 pounds of fuel consumption from the fifth historical vehicle operation 518 and output the 23,000 pounds of fuel consumption to the vehicle planning system 120. The vehicle planning application 122 in the vehicle planning system 120 then inserts the 23,000 pounds as the predicted fuel consumption in the vehicle operation plan 124 for the planned vehicle operation.

In another aspect, the fuel prediction application 112 could calculate a mean fuel consumption from the returned historical vehicle operations. For example, the fuel consumption values for the seven historical vehicle operations 510, 512, 514, 516, 518, 520, and 522 in table 500 results in an average fuel consumption value of 20,678 pounds of fuel. The fuel prediction application 112 could select the 20,678 pounds of fuel consumption and output the 20,678 pounds of fuel consumption to the vehicle planning system 120. The vehicle planning application 122 then inserts the 20,678 pounds of fuel consumption as the predict fuel consumption in the vehicle operation plan 124 for the planned vehicle operation.

In another aspect, the fuel prediction application 112 calculates a weighted average fuel consumption from the returned historical vehicle operations, wherein the weightings are based on the similarity scores. For example, the weighted average fuel consumption could be calculated according to equation 2:

$$\text{Predicted Fuel Consumption} = \frac{w_a f_a + w_b f_b + \ldots + w_n f_n}{(w_a + w_b + \ldots + w_n)};$$

wherein $w_a$ is the score of the first returned historical vehicle operation, $w_b$ is the score of the second returned historical vehicle operation, $w_n$ is the score of the nth returned historical vehicle operation, $f_a$ is the fuel consumption of the first returned historical vehicle operation, $f_b$ is the fuel consumption of the second returned historical vehicle operation, and $f_n$ is the fuel consumption of the nth returned historical vehicle operation. For example, the fuel consumption values for the seven historical vehicle operations 510, 512, 514, 516, 518, 520, and 522 in table 500 results in a weighted average fuel consumption value according to Equation (2) of 20,683 pounds of fuel. The fuel prediction application 112 could select the 20,683 pounds of fuel consumption and output the 20,683 pounds of fuel consumption to the vehicle planning system 120. The vehicle planning application 122 then inserts the 20,683 pounds of fuel consumption as the predict fuel consumption in the vehicle operation plan 124 for the planned vehicle operation.

In various aspects, the fuel prediction application 112 could use other suitable equations or selection criteria to identify fuel consumption for the planned vehicle operation from the fuel consumption data returned from the historical vehicle operations. For example, the fuel prediction application 112 could use a median fuel consumption value from the returned historical vehicle operations or a minimum fuel consumption value from the returned historical vehicle operations.

Figure 6:
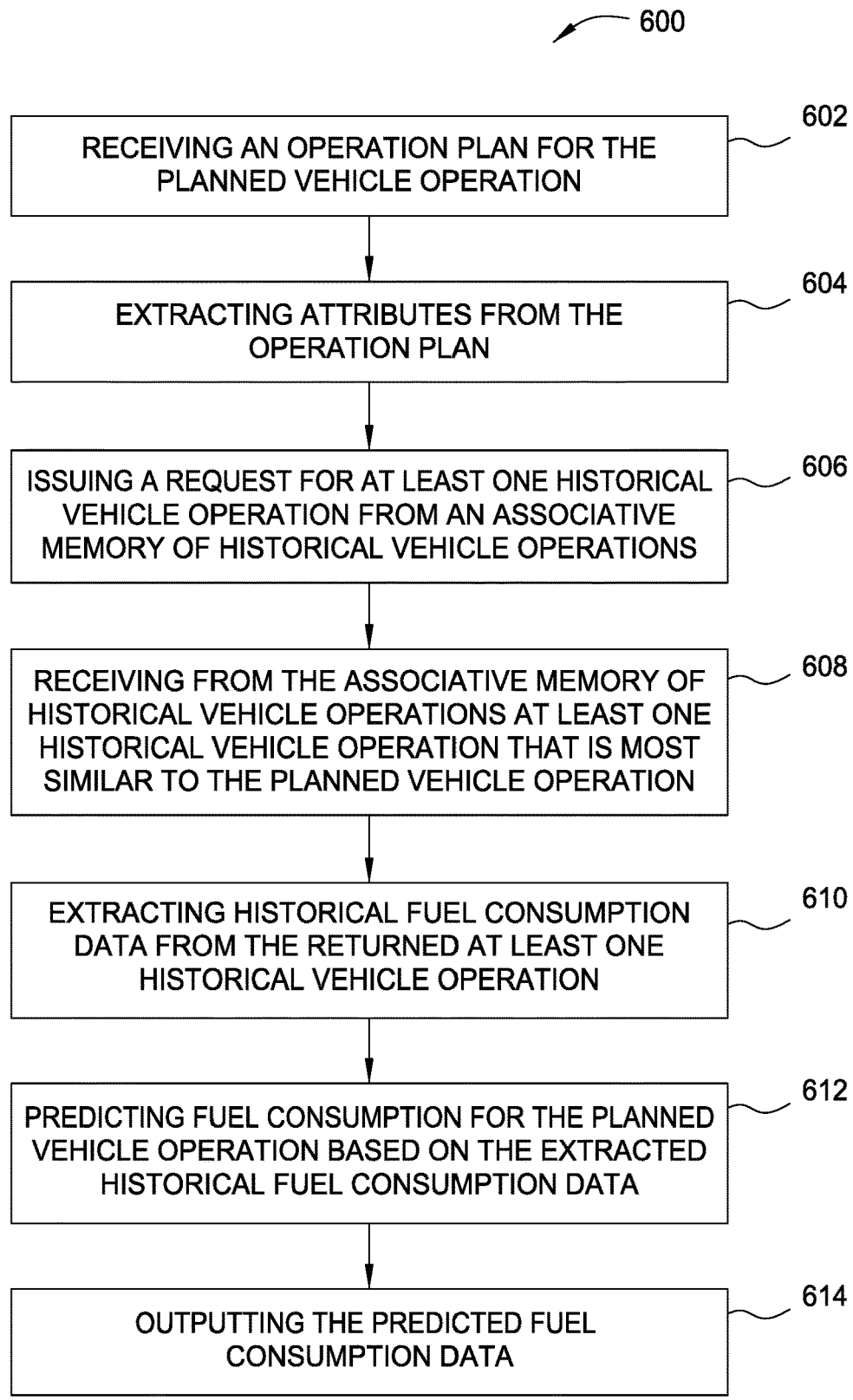
FIG. 6 is a flow chart for a method according to one aspect for predicting fuel consumption for a vehicle operation using an associative memory of historical vehicle operations.

FIG. 6 is a flow chart for a method 600 for predicting fuel consumption for a planned vehicle operation. In block 602 of the method 600, an operation plan for the planned vehicle operation is received. For example, with reference to FIG. 1, the system 100 could receive the vehicle operation plan 124 from the vehicle planning system 120 via the input 116. The operation plan includes values for various attribute categories for the planned vehicle operation. For example, in the context of commercial aircraft operation, the various attribute categories can include a departure airport, an arrival airport, a distance traveled, a cruise altitude, cruise speed, a planned number of passengers, and many other attributes. In block 604, the values for the attribute categories can be extracted from the operation plan. For example, the fuel prediction application 112 could extract the values for the attribute categories from the operation plan. In block 606, a request is issued to an associative memory for at least one historical vehicle operation and, in block 608, at least one historical vehicle operation can be returned from an associative memory of historical vehicle operations. Again referring to FIG. 1, the fuel prediction application 112 could return from the associative memory 106 historical vehicle operations 108 that are mathematically calculated to be similar to planned vehicle operation based on a comparison of the extracted values of attribute categories from the vehicle operation plan 124 and values of the attribute categories for the historical vehicle operations 108. In block 610, historical fuel consumption data from the returned historical vehicle operations is extracted. For example, the fuel prediction application 112 could extract the fuel consumption data from the returned historical vehicle operations 108. In block 612, fuel consumption for the planned vehicle operation based on the extracted historical fuel consumption data can be predicted. For example, the fuel prediction application 112 could determine a maximum fuel consumption value, an average fuel consumption value, a median fuel consumption value, a weighted average fuel consumption value, or some other fuel consumption value from the fuel consumption data for the returned historical vehicle operations and identify the determined value as a predicted fuel consumption for the planned vehicle operation. In block 614, the predicted fuel consumption data is output. For example, the fuel prediction application 112 output the predicted fuel consumption data to the vehicle planning system 120 via the output 118 of the system 100. The vehicle planning application 122 of the vehicle planning system 120 can receive the predicted fuel consumption data and automatically incorporate the predicted fuel consumption data into the vehicle operation plan 124. In various aspects, an amount of fuel equal to the amount predicted by the predicted fuel consumption data could be loaded onto the vehicle. In various aspects, an amount of fuel equal to the amount predicted by the predicted fuel consumption data plus a buffer amount (e.g., 5% of the amount predicted by the predicted fuel consumption data) could be loaded onto the vehicle.

Figure 7:
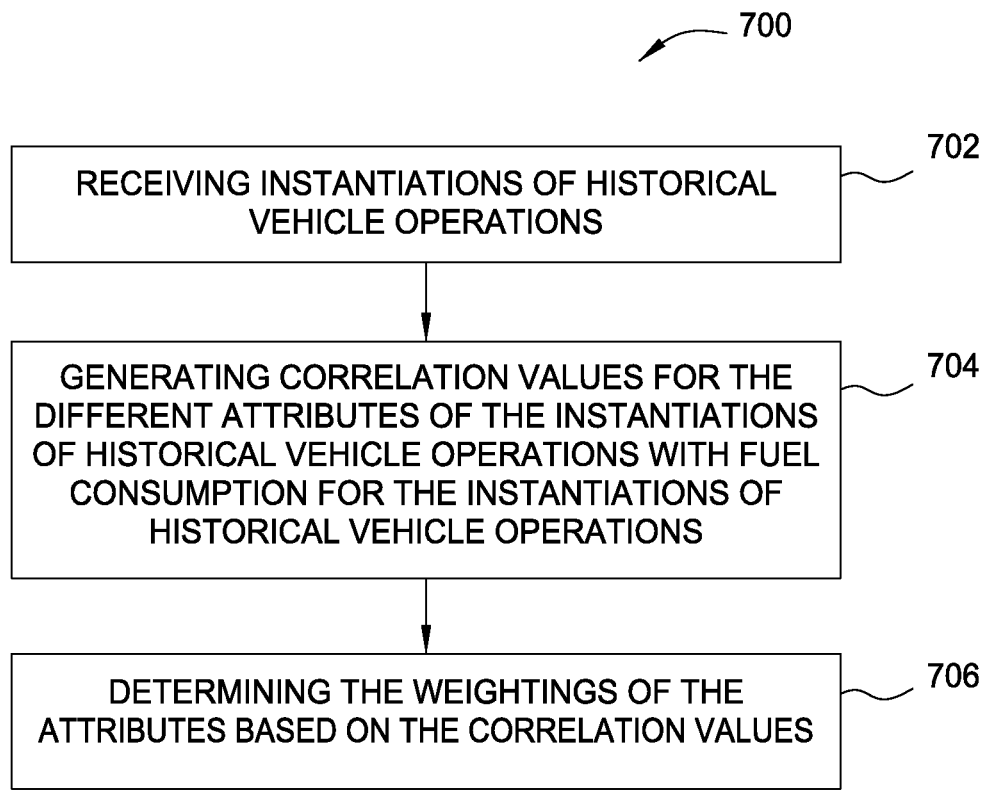
FIG. 7 is a flow chart for a method according to one aspect for automatically determining weightings of attributes for historical vehicle operations in an associative memory.

FIG. 7 is a flowchart for a method 700 for generating or building an associative memory of historical vehicle operations. In block 702, instantiations of historical vehicle operations are received. For example, the system 100 can receive instantiations of historical vehicle operations 108 via the input 116, and the received instantiations can be stored in the memory 104 of the system 100. In block 704 correlation values for the different attributes of the instantiations of historical vehicle operations with fuel consumption for the instantiations can be generated. For example, the associative memory building application 114 could generate such correlation values as discussed above with reference to FIGS. 4A-4E. In block 706, weightings of attribute categories can be determined based on the correlation values determined in block 704. For example, the associative memory building application 114 could assign weightings proportional to the correlation values, and store the attribute weightings 110 in the memory 104. The historical vehicle operations 108 and the attribute weightings 110 form the associative memory 106.

As discussed above, in various aspects, in block 704 and 706 of the method 700 are replaced or at least partially overruled by a subject matter expert or other user selecting weightings for the various attribute categories. For example, the subject matter expert could use the graphical user interface 300 in FIG. 3 to select weightings for various attribute categories. In aspects where the associative memory building application 114 determined correlation values and determined weightings based on the correlation use (block 704 and 706), the subject matter expert could overrule such automatically determined weightings using the graphical user interface 300.

As planned vehicle operations are performed, the planned values for the attribute categories in the vehicle operation plan can be replaced with actual values to form a historical vehicle operation 108 for inclusion in the associative memory 106. Periodically, the associative memory building application 114 can re-execute blocks 702 through 706 of the method 700 to incorporate the new historical vehicle operations 108, generate updated correlations, and determine updated weightings based on the updated correlations.

Data collection in vehicles, such as aircraft, is becoming more and more prolific over time. As more data is collected and as more instantiations of flights are added to an associative memory, the fuel usage predictions will improve as well.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

The aspects described herein may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of at least one aspect, a user may access applications (e.g., at least one of the fuel prediction application 112 and the associative memory building application 114) or related data available in the cloud. For example, the fuel prediction application 112 could execute on a computing system in the cloud and output the predicted fuel consumption for the planned vehicle operation. In such a case, the fuel prediction application 112 could output the predicted fuel consumption data and store the output predicted fuel consumption data at a storage location in the cloud. Doing so allows a user to access this information from any computing system attached to a network connected to the cloud (e.g., the Internet).

The use of the term "vehicle" herein is inclusive of any vehicle or vehicle type, such as aircraft, automobiles, boats, ships, trains, and construction vehicles.

While the foregoing is directed to certain aspects, other and further aspects may be devised without departing from the basic scope thereof, and the scope thereof is determined by the claims that follow.

The invention claimed is:

1. A computer-implemented method for calculating a predicted fuel consumption for a planned vehicle operation, the method comprising:
    accessing an associative memory device, using one or more attributes of an operation plan for the planned vehicle operation, to determine at least one historical vehicle operation from a plurality of historical vehicle operations that is similar to the planned vehicle operation, wherein the associative memory device contains data for a plurality of attributes and collected from the plurality of historical vehicle operations, and wherein the at least one historical vehicle operation is determined by applying a respective weight defined within the associative memory device to data values for each of the plurality of attributes;
    predicting fuel consumption data for the planned vehicle operation, based on historical fuel consumption data corresponding to the at least one historical vehicle operation; and
    outputting the predicted fuel consumption data.

2. The computer-implemented method of claim 1, further comprising:
    extracting the one or more attributes from the operation plan; and
    extracting the historical fuel consumption data from the at least one historical vehicle operation.

3. The computer-implemented method of claim 2, wherein predicting fuel consumption for the planned vehicle operation further comprises:
    calculating an average of the extracted historical fuel consumption data; and
    assigning the calculated average as the predicted fuel consumption for the planned vehicle operation.

4. The computer-implemented method of claim 2, wherein determining the at least one historical vehicle operation from the plurality of historical vehicle operations that is similar to the planned vehicle operation further comprises determining any historical vehicle operations from the plurality of historical vehicle operations with an attribute-matching score above a threshold value.

5. The computer-implemented method of claim 4, wherein predicting fuel consumption data for the planned vehicle operation based on the extracted historical fuel consumption data comprises:
    calculating a weighted average of the extracted historical fuel consumption data, wherein weights used in calculating the weighted average are based on the attribute-matching scores of the returned historical vehicle operations; and
    assigning the calculated weighted average as the predicted fuel consumption for the planned vehicle operation.

6. The computer-implemented method of claim 1, further comprising automatically updating a fuel load of a vehicle operation plan for the planned vehicle operation based on the output predicted fuel consumption data.

7. The computer-implemented method of claim 1, wherein the planned vehicle operation is a flight of a commercial aircraft, and further comprising automatically updating a load sheet for the flight based on the output predicted fuel consumption data.

8. The computer-implemented method of claim 1, wherein an amount of fuel determined by the predicted fuel consumption data is loaded in the vehicle.

9. The computer-implemented method of claim 1, wherein an amount of fuel determined by the predicted fuel consumption data plus a buffer of fuel is loaded in the vehicle.

10. A system, comprising:
    one or more computer processors;
    an associative memory device; and
    a memory containing computer program code that, when executed by operation of the one or more computer processors, performs an operation for calculating a predicted fuel consumption for a planned vehicle operation, the operation comprising:
        accessing the associative memory device, using one or more attributes of an operation plan for the planned vehicle operation, to determine at least one historical vehicle operation from a plurality of historical vehicle operations that is similar to the planned vehicle operation, wherein the associative memory device contains data for a plurality of attributes and collected from the plurality of historical vehicle operations, and wherein the at least one historical vehicle operation is determined by applying a respective weight defined within the associative memory device to data values for each of the plurality of attributes;
        predicting fuel consumption data for the planned vehicle operation, based on historical fuel consumption data corresponding to the at least one historical vehicle operation; and
        outputting the predicted fuel consumption data.

11. The system of claim 10, the operation further comprising:
    extracting the one or more attributes from the operation plan; and
    extracting the historical fuel consumption data from the at least one historical vehicle operation.

12. The system of claim 11, wherein predicting fuel consumption for the planned vehicle operation further comprises:
    calculating an average of the extracted historical fuel consumption data; and
    assigning the calculated average as the predicted fuel consumption for the planned vehicle operation.

13. The system of claim 11, wherein determining the at least one historical vehicle operation from the plurality of historical vehicle operations that is similar to the planned vehicle operation further comprises determining any historical vehicle operations from the plurality of historical vehicle operations with an attribute-matching score above a threshold value.

14. The system of claim 13, wherein predicting fuel consumption data for the planned vehicle operation based on the extracted historical fuel consumption data comprises:
    calculating a weighted average of the extracted historical fuel consumption data, wherein weights used in calculating the weighted average are based on the attribute-matching scores of the returned historical vehicle operations; and
    assigning the calculated weighted average as the predicted fuel consumption for the planned vehicle operation.

15. The system of claim 10, further comprising automatically updating a fuel load of a vehicle operation plan for the planned vehicle operation based on the output predicted fuel consumption data.

16. The system of claim 10, wherein the planned vehicle operation is a flight of a commercial aircraft, and further comprising automatically updating a load sheet for the flight based on the output predicted fuel consumption data.

17. The system of claim 10, wherein an amount of fuel determined by the predicted fuel consumption data is loaded in the vehicle.

18. The system of claim 10, wherein an amount of fuel determined by the predicted fuel consumption data plus a buffer of fuel is loaded in the vehicle.

19. A computer-implemented method for determining a predicted fuel consumption for a planned vehicle operation, the method comprising:
generating a query configured to return predicted fuel consumption data for an operation plan for the planned vehicle operation;
transmitting the generated query to a remote system, wherein the remote system is configured to:
access an associative memory device, using one or more attributes of the operation plan for the planned vehicle operation, to determine at least one historical vehicle operation from a plurality of historical vehicle operations that is similar to the planned vehicle operation, wherein the associative memory device contains data for a plurality of attributes and collected from the plurality of historical vehicle operations, and wherein the at least one historical vehicle operation is determined by applying a respective weight defined within the associative memory device to data values for each of the plurality of attributes; and
predict fuel consumption data for the planned vehicle operation, based on historical fuel consumption data corresponding to the at least one historical vehicle operation; and
receiving, from the remote system, the predicted fuel consumption data.

20. The computer-implemented method of claim 19, wherein an amount of fuel determined based on the predicted fuel consumption data is loaded into a vehicle scheduled to perform the planned vehicle operation.

* * * * *